United States Patent
Ohgi et al.

(10) Patent No.: US 12,054,426 B2
(45) Date of Patent: Aug. 6, 2024

(54) HYDRAULIC COMPOSITION FOR ADDITIVE MANUFACTURING DEVICE, AND METHOD FOR PRODUCING CASTING MOLD

(71) Applicant: TAIHEIYO CEMENT CORPORATION, Tokyo (JP)

(72) Inventors: Yoshifumi Ohgi, Chiba (JP); Yusuke Ishii, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 585 days.

(21) Appl. No.: 17/297,209

(22) PCT Filed: Dec. 11, 2019

(86) PCT No.: PCT/JP2019/048448
§ 371 (c)(1),
(2) Date: May 26, 2021

(87) PCT Pub. No.: WO2020/122109
PCT Pub. Date: Jun. 18, 2020

(65) Prior Publication Data
US 2022/0033308 A1 Feb. 3, 2022

(30) Foreign Application Priority Data

Dec. 15, 2018 (JP) ................................ 2018-235003
Jan. 29, 2019 (JP) ................................ 2019-013043

(51) Int. Cl.
| | |
|---|---|
| C04B 28/06 | (2006.01) |
| B33Y 10/00 | (2015.01) |
| B33Y 70/10 | (2020.01) |
| B33Y 80/00 | (2015.01) |
| C04B 7/02 | (2006.01) |
| C04B 24/26 | (2006.01) |
| C04B 111/00 | (2006.01) |

(52) U.S. Cl.
CPC .............. C04B 28/06 (2013.01); B33Y 10/00 (2014.12); B33Y 70/10 (2020.01); B33Y 80/00 (2014.12); C04B 7/02 (2013.01); C04B 24/2623 (2013.01); C04B 2111/00181 (2013.01); C04B 2111/00939 (2013.01)

(58) Field of Classification Search
CPC ......... B28B 1/001; B33Y 10/00; B33Y 70/00; B33Y 70/10; B33Y 80/00; C04B 28/06; C04B 7/02; C04B 24/2623; C04B 7/345; C04B 14/06; C04B 24/26; C04B 2111/00181; C04B 2111/00939
See application file for complete search history.

(56) References Cited

FOREIGN PATENT DOCUMENTS

| | | | |
|---|---|---|---|
| CN | 106799461 A | * | 6/2017 |
| JP | 2011-051010 A | | 3/2011 |
| JP | 2018193595 A | * | 12/2018 |

OTHER PUBLICATIONS

Inoie et al "Effect of Compounding Ingredients in the Making of Highly Heat-Resistant Molds Using an Inkjet 3D Printer", Lecture Abstract Collection for the 163rd National Lecture Conference of the Japan Foundry Engineering Society, p. 74 (Year: 2013).*
Translation of Written Opinion for WO2020122109, International Application No. PCT/JP2019/048448. (Year: 2020).*

* cited by examiner

*Primary Examiner* — Anthony J Green
(74) *Attorney, Agent, or Firm* — Posz Law Group, PLC

(57) ABSTRACT

A hydraulic composition for an additive manufacturing device, the hydraulic composition containing at least sand, an inorganic binder, and polyvinyl alcohol, wherein the hydraulic composition for an additive manufacturing device satisfies conditions (1) and (2).

(1) The mass ratio of sand/(inorganic binder+polyvinyl alcohol) is 4 to 12.
(2) The mass ratio of polyvinyl alcohol/inorganic binder is 0.1 to 0.4.

The hydraulic composition for an additive manufacturing device also preferably satisfies condition (3).

(3) The mass ratio of water/(inorganic binder+polyvinyl alcohol) is 0.30 to 1.30.

3 Claims, No Drawings

HYDRAULIC COMPOSITION FOR ADDITIVE MANUFACTURING DEVICE, AND METHOD FOR PRODUCING CASTING MOLD

CROSS REFERENCE TO RELATED APPLICATIONS

This application is a U.S. national stage application of International Patent Application No. PCT/JP2019/048448 filed on Dec. 11, 2019, which claims priority to Japanese Patent Application No. 2018-235003 filed on Dec. 15, 2018 and Japanese Patent Application No. 2019-013043 filed on Jan. 29, 2019, the disclosures of which are incorporated herein by reference.

TECHNICAL FIELD

The present invention relates to a hydraulic composition for an additive manufacturing device (3D printer) (this composition is also concisely referred to as a "hydraulic composition" hereinbelow), with the hydraulic composition exhibiting an excellent early flexural strength development performance at a material age within 24 hours, and also relates to a method for producing a casting mold using this composition.

BACKGROUND ART

Casting is a traditional metal processing technique in which a casting is produced by introduction of molten metal into a casting mold. Self-hardening casting molds used for this casting are classified into organic systems and inorganic systems in accordance with a caking material (binder) to be used. The inorganic systems here include mainly water glass systems and cement systems. With cement-based self-hardening casting molds, depending on the casting temperature, the gypsum contained therein may undergo thermal decomposition, thereby generating gas, then, defects may be produced in the casting and the aesthetic appearance and performance thereof may be impaired. Moreover, the production of such casting molds requires a preliminary step of producing a model or wooden form, and this preliminary step imposes a time and cost burden.

Therefore, development of a casting mold production means which does not require this preliminary step and which avoids a loss of aesthetic appearance and so forth by the casting has been awaited.

Additive manufacturing devices have been receiving attention recently as a high-speed precision molding means. Among these additive manufacturing devices, for example, a powder lamination molding device is a device that carries out molding, by generating successive layers in the vertical direction, of a solid that is obtained by spreading and leveling a powder on a flat surface and then spraying an aqueous binder on this powder and solidifying the same. A characteristic feature of the device is that the device produces a molded article by partitioning data on a solid molded article, which has been produced, by three-dimensional CAD and so forth, into a large number of horizontal planes and successively stacking the shapes of these horizontal planes.

If a casting mold could be produced using such a device, this would render the aforementioned preliminary step unnecessary and may be able to reduce process time and cost.

For example, PTL 1 discloses a technology that provides, as a hydraulic composition for additive manufacturing devices that is suitable for the binder jetting method (powder lamination molding method), a molded article formed by carrying out solidification and layering by addition of an aqueous binder to a material obtained by incorporating 15, to 50% rapid-hardening cement into a refractory sand such as silica sand, olivine sand, or artificial sand, before kneading (mixing) the same. This binder jetting method is a method in which a desired shape is formed by successively stacking solidified layers, the solidified layers being obtained by solidifying a powder material residing on a loading platform (pedestal) by dripping or spraying a molding solution, e.g., an inkjet, via a nozzle, over a prescribed range of the powder material.

However, a molded article fabricated with an additive manufacturing device using the material described in PTL 1 does not exhibit a satisfactory early strength development performance, particularly, flexural strength, and, as a consequence, defects readily occur and it may be difficult to achieve a stable product supply and production of finely shaped products, which is a characteristic feature of molding technologies that use additive manufacturing devices.

In addition, in a case of production of a casting mold having a complex shape, cracking may be produced when dimensional variations, e.g., shrinkage or expansion, occur after molding. Moreover, when the dimensions of manufactured molded articles, e.g., casting molds, vary, then a process for adjusting the dimensions of the molded articles becomes necessary.

CITATION LIST

Patent Literature

[PTL 1] Japanese Patent Application Laid-open No. 2011-51010

SUMMARY OF INVENTION

Technical Problem

Therefore, an object of the present invention is to provide a hydraulic composition for an additive manufacturing device, exhibiting an excellent early flexural strength development performance at a material age within 24 hours and exhibiting an excellent dimensional stability.

Solution to Problem

As a result of intensive investigations directed to solving this problem, the present inventors discovered that the aforementioned object could be achieved by a hydraulic composition for an additive manufacturing device that has, inter alia, a prescribed sand/(inorganic binder+polyvinyl alcohol) mass ratio, and the present invention has been completed as a result.

That is, the present invention is, inter alia, a hydraulic composition for an additive manufacturing device having following constitution.

[1] A hydraulic composition for an additive manufacturing device, including at least sand, an inorganic binder, and polyvinyl alcohol, wherein
the hydraulic composition for an additive manufacturing device satisfies conditions (1) and (2) below:
(1) a mass ratio of the sand/(inorganic binder+polyvinyl alcohol) is 4 to 12; and (2) a mass ratio of the polyvinyl alcohol/inorganic binder is 0.1 to 0.4.

[2] The hydraulic composition for an additive manufacturing device according to [1], which additionally satisfies condition (3) below:

(3) a mass ratio of the water/(inorganic binder+polyvinyl alcohol) is 0.30 to 1.30.

[3] The hydraulic composition for an additive manufacturing device according to [1] or [2], wherein the inorganic binder is calcium aluminates alone or contains at least 50 mass % and less than 100 mass % of calcium aluminates for 100 mass % of a total of the calcium aluminates and a rapid-hardening cement.

[4] The hydraulic composition for an additive manufacturing device according to [3], wherein the calcium aluminates are amorphous calcium aluminate.

[5] A method for producing a casting mold, the casting mold being produced using an additive manufacturing device and the hydraulic composition for an additive manufacturing device according to any of [1] to [4].

Advantageous Effects of Invention

The hydraulic composition for an additive manufacturing device exhibits a high early flexural strength development performance, a high dimensional stability, little powder leakage from the additive manufacturing device, and easy spreading and leveling.

DESCRIPTION OF EMBODIMENTS

As indicated above, the present invention is, inter alia, a hydraulic composition for additive manufacturing devices, comprising at least sand, an inorganic binder, and polyvinyl alcohol. The sand, inorganic binder, polyvinyl alcohol, and so forth for the present invention are individually described in the following.

1. Sand

The sand/(inorganic binder+polyvinyl alcohol) mass ratio in the hydraulic composition for additive manufacturing devices according to the present invention is 4 to 12. When this ratio is less than 4, it can then be difficult to spread and level the hydraulic composition; when 12 is exceeded, the flexural strength of the molded article from the hydraulic composition can be reduced and powder leakage from the additive manufacturing device can be produced. This ratio is preferably 5 to 11, more preferably 6 to 10.5, and still more preferably 7 to 9.

This sand should be a refractory sand, but is not otherwise particularly limited, and can be exemplified by one or more selections from, e.g., silica sand, olivine sand, zircon sand, chromite sand, alumina sand, and artificial sand.

2. Inorganic Binder

The inorganic binder is an inorganic binder that contains, as an essential component, one or more selections from the calcium aluminates indicated below, and that may contain a rapid-hardening cement as an optional component. The calcium aluminates, rapid-hardening cement, and so forth are individually described in detail in the following.

(1) Calcium Aluminates

The calcium aluminates can be exemplified by one or more selections from calcium aluminate, e.g., $3CaO \cdot Al_2O_3$, $2CaO \cdot Al_2O_3$, $12CaO \cdot 7Al_2O_3$, $5CaO \cdot 3Al_2O_3$, $CaO \cdot Al_2O_3$, $3CaO \cdot 5Al_2O_2$, and $CaO \cdot 2Al_2O_3$; calcium aluminoferrite, e.g., $2CaO \cdot Al_2O_3 \cdot Fe_2O_3$ and $4CaO \cdot Al_2O_3 \cdot Fe_2O_3$; calcium haloaluminate provided by the solid dissolution or substitution of halogen into calcium aluminate, including calcium fluoroaluminate, e.g., $3CaO \cdot 3Al_2O_3 \cdot CaF_2$ and $11CaO \cdot 7Al_2O_3 \cdot CaF_2$; calcium sodium aluminate, e.g., $8CaO \cdot Na_2O \cdot 3Al_2O_2$ and $3CaO \cdot 2Na_2O \cdot 5Al_2O_3$; calcium lithium aluminate; alumina cement; and minerals provided by the solid dissolution of a trace element (including, e.g., the oxide) such as Na, K, Li, Ti, Fe, Mg, Cr, P, F, and S, in the preceding compounds.

Among these calcium aluminates, calcium aluminate is preferred from the standpoints of little gas generation in application as a casting mold and a strength development performance that is high, while amorphous calcium aluminate is particularly preferred. Amorphous calcium aluminate, being produced by quenching of the molten starting material, substantially does not possess a crystalline structure and generally has a glass content of at least 80%. A higher glass content provides a higher early strength development performance, and as a consequence the glass content is preferably at least 90.

The $CaO/Al_2O_3$ molar ratio for the calcium aluminates is preferably 1.5 to 3.0 and more preferably 1.7 to 2.4. When this molar ratio is 1.5 or greater, the hydraulic composition exhibits a high early strength development performance; the hydraulic composition has a high heat resistance at 3.0 and below.

In addition, in order to obtain a satisfactory early strength development performance and suppress the generation of dust, the Blaine specific surface area (fineness stipulated in JIS R 5201) of the calcium aluminates is preferably 1,000 to 6,000 $cm^2/g$ and is more preferably 1,500 to 5,000 $cm^2/g$. In order to provide a uniform spreading and leveling by the additive manufacturing device and in order to not lower the strength of the casting mold, the Blaine specific surface area of the calcium aluminates is more preferably 1,500 to 4,000 $cm^2/g$ and is particularly preferably 2,000 to 3,000 $cm^2/g$.

The content of calcium aluminates in the inorganic binder is preferably 50 mass % to 100 mass %. The hydraulic composition has both a high early strength development performance and a high heat resistance when this value is at least 50 mass %. This value is preferably 60 to 100 mass %, more preferably 70 mass % to 100 mass %, and still more preferably 80 mass % to 100 mass %.

(2) Rapid-Hardening Cement

In order to achieve additional improvements in the early strength development performance, the inorganic binder may contain a rapid-hardening cement (also referred to as a super-rapid-hardening cement) as an optional component. This rapid-hardening cement is preferably a rapid-hardening cement or water-stop cement that sets (initial), as measured in accordance with JIS R 5210, within 30 minutes. Commercial products for rapid-hardening cements are Super Jet Cement (Taiheiyo Cement Corporation), Jet Cement (Sumitomo Osaka Cement Co., Ltd.), Lion Shisui (registered trademark, Sumitomo Osaka Cement Co., Ltd.), and Denka Super Cement (Denka Company Limited). Among the preceding, a gypsum-containing rapid-hardening cement is preferred because it provides a high early strength development performance and because small amounts of gypsum are easily added.

In order to improve the early strength development performance and generate little gas in application as a casting mold, the content of the rapid-hardening cement in the inorganic binder is preferably 0 mass % to 50 mass %, more preferably 0 mass % to 30 mass %, and still more preferably 5 mass % to 20 mass %, where 100 mass % refers to the overall inorganic binder.

(3) Other Optional Components in the Inorganic Binder

The inorganic binder may contain cement as an additional optional component. This cement preferably sets (initial), as measured in accordance with JIS R 5210, within three hours and 30 minutes because the early strength development performance at three hours after molding is then high; within one hour is more preferred. In order to improve the early strength development performance, the content of the cement in the inorganic binder is preferably 0 mass % to 50 mass %, more preferably 0 mass % to 30 mass %, and still more preferably 0 mass % to 20 mass % where 100 mass % refers to the overall inorganic binder.

The cement can be exemplified by one or more selections from ordinary Portland cement, high early strength Portland cement, moderate heat Portland cement, low heat Portland cement, white Portland cement, eco cement, blast furnace cement, fly ash cement, and cement clinker powder. Cement clinker powder is also included as a cement in the present invention.

The calcium silicate content in the cement is preferably at least 25 mass % where 100 mass % refers to the overall cement. The strength development performance at a material age of one day is high when this content is at least 25 mass %. When a long-term strength development performance is required, this content is preferably at least 45 mass %.

The inorganic binder may contain optional components such as blast furnace slag, fly ash, fumed silica, hydrophobic fumed silica, and so forth as materials for adjusting the strength development performance and/or for adjusting the properties of the powder. In addition, for example, an alkali metal carbonate, alkali metal lactate, alkaline-earth metal lactate, alkali metal silicate, and so forth may be incorporated as a hardening accelerator as an optional component.

3. Polyvinyl Alcohol

The mass ratio between the polyvinyl alcohol and inorganic binder in the hydraulic composition for additive manufacturing devices according to the present invention is 0.1 to 0.4 as polyvinyl alcohol/inorganic binder. At less than 0.1 for this ratio, the initial strength and dimensional accuracy may be low, while the dimensional accuracy may be low at above 0.4. This ratio is preferably 0.15 to 0.35 and is more preferably 0.20 to 0.30. In addition, the polyvinyl alcohol/(inorganic binder+sand) mass ratio is preferably 0.01 to 0.03. A low early strength becomes a concern when this mass ratio is less than 0.01. When this mass ratio exceeds 0.03, the dimensional accuracy is inferior and, in application as a casting mold, large amounts of gas are produced and a rough skin on the casting mold is then a concern. This mass ratio is more preferably 0.015 to 0.025.

The polyvinyl alcohol used in the present invention is the partial saponification product or the complete saponification product of polyvinyl acetate, and the degree of saponification is preferably 85 mol % to 90 mol % because a higher early strength development performance is then obtained.

The average particle diameter (median diameter, D50) of this polyvinyl alcohol is preferably 10 to 150 μm and is more preferably 30 to 90 μm, because a high flexural strength is then obtained. In addition, when the particle size of the polyvinyl alcohol is adjusted by mixing and milling it with either the calcium aluminates or rapid-hardening cement or with both the calcium aluminates and rapid-hardening cement, finer particles are provided and uniform mixing is made possible and the early strength development performance of the hydraulic composition is further increased.

The polyvinyl alcohol may be used in powder form mixed with the inorganic binder and/or sand or may be used dissolved in the water described in the following.

4. Water

The water/(inorganic binder+polyvinyl alcohol) mass ratio is preferably 0.30 to 1.30. The flexural strength tends to be low when this mass ratio is less than 0.30; when it exceeds 1.30, a low flexural strength and a low dimensional accuracy are then concerns. In order to further increase the dimensional accuracy and flexural strength of the casting mold, this mass ratio is more preferably 0.40 to 1.30, still more preferably 0.50 to 1.20, and most preferably 0.70 to 1.05.

5. Method for Producing Models or Casting Molds

This production method is a method that produces a model or casting mold by fabricating a molded article using the hydraulic composition according to the present invention and an additive manufacturing device. There are no particular limitations on the additive manufacturing device, and commercial products can be used, for example, an additive manufacturing device that employs powder lamination. The pre-water-incorporation hydraulic composition is prepared by mixing the components of this hydraulic composition using commercial mixer or a manual operation. When a plurality of materials are used as the binder material, the binder materials can be preliminarily mixed using a commercial or mixer a manual operation or can be simultaneously pulverized using a pulverizer.

The method for curing the molded article can be, for example, atmospheric curing alone or curing in water after atmospheric curing, or curing with a surface impregnation agent. Among these, atmospheric curing alone is preferred in order to improve the early strength development performance and suppress water vapor generation during production of the cast. In order to increase the strength due to, e.g., the calcium aluminates, polyvinyl alcohol, and rapid-hardening cement, the temperature of the atmospheric curing is preferably 10° C. to 100° C. and is more preferably 30° C. to 80° C. In addition, in order to provide a satisfactory strength development and improve the production efficiency, the relative humidity during atmospheric curing is preferably 10% to 90%, more preferably 15% to 80%, and still more preferably 20% to 60%. In order to improve the production efficiency and provide a satisfactory strength development performance, the atmospheric curing time is preferably one hour to one week, more preferably two hours to five days, and still more preferably three hours to four days.

In the case of use as a model, from the standpoint of practicality the target value for the flexural strength is preferably at least 0.3 N/mm$^2$ at a material age of three hours, this being a strength that enables at least portability. It is preferably at least 1.0 N/mm$^2$ at a material age of 24 hours, which is a strength that enables use without damage. In the case of use as a casting mold, the dimensional difference, this being the dimensional difference between the design values and the hydraulic composition (casting mold), is preferably in the range of 100±5%.

In addition, in the case of use of the hydraulic composition as a casting mold, the ignition loss of the molded article at a material age of three days is preferably not more than 6.5 mass %, more preferably not more than 5.0 mass %, and still more preferably not more than 4.5 mass %. When the ignition loss is not more than 6.5 mass %, defects such as, e.g., blow holes, are not produced in the cast. This ignition loss is a metric of the amount of gas production in application as a casting mold; this gas contains, e.g., moisture, a sulfur fraction, and so forth. When the molded article is used as a casting mold, the ignition loss may be measured at the completion of curing. However, to carry out a more rigorous control, the molded article, after curing for three days and more preferably after curing for three hours, is heated as such—without drying or pulverization—to a constant weight at 1400° C., and the ignition loss is then calculated based on the following formula and the mass of the molded article measured before and after the heating: difference in mass of the molded article pre-versus-post-heating×100/ mass of the molded article pre-heating.

EXAMPLES

The present invention is described in the following using examples, but the present invention is not limited to or by these examples.

1. Materials Used (1) Artificial Sand
  (i) product name: ESPEARL #180L (abbreviation: EP)
    alumina type, from Yamakawa Sangyo Co., Ltd.
  (ii) product name: Naigai Cerabeads #1450 (abbreviation: SB1)
    alumina type, from Itochu Ceratech Corporation
  (iii) product name: Naigai Cerabeads #1700 (abbreviation: SB2)
    alumina type, from Itochu Ceratech Corporation
  (iv) product name: Zircon Sand (abbreviation: ZS)
    The main component is zirconium silicate and the median diameter (D50) is 100 μm; from Hakusui Tech Co., Ltd.
  (v) product name: Zircon Flour A-PAX (abbreviation: ZF)
    The main component is zirconium silicate and the median diameter (D50) is 1 μm; from Kinsei Matec Co., Ltd.
  (vi) product name: Zircosil No. 1 200 mesh (abbreviation: Z)
    The main component is zirconium silicate and the median diameter (D50) is 24 μm; from Hakusui Tech Co., Ltd.
  (vii) product name: Alumina Flour #200 (abbreviation: AF)
    Alumina type; component that passes a 200-mesh screen; from Ace Trading Co., Ltd.
  (viii) mullite (abbreviation: MU)
    The ground product obtained by grinding the Naigai Cerabeads #1450 of (ii) using a ball mill; the Blaine specific surface area of this ground product is 2,700 cm²/g.

(2) Calcium Aluminates
  (i) Amorphous calcium aluminate (abbreviations: CA1, CA2, CA3)
    Trial products for which the CaO/Al$_2$O$_3$ molar ratio of the amorphous calcium aluminate is 2.2 and the glass content is at least 95. The Blaine specific surface area of the amorphous calcium aluminate is 2,040 cm²/g for CA1, 3,490 cm²/g for CA2, and 2,680 cm²/g for CA3.

(ii) Alumina cement (abbreviation: AC)
    product name: Denka Alumina Cement No. 1, Blaine specific surface area of 4,570 cm²/g, from Denka Co., Ltd.

(3) Polyvinyl Alcohol (Abbreviation: PVA)
  Product number 22-88 Si (PVA217SS), from Kuraray Co., Ltd.
  The degree of saponification is 87 to 89%; the average particle diameter (median diameter, D50) is 60 μm; the content of particles larger than 94 μm is 29 mass %; the content of particles larger than 77 μm is 47 mass %; the 10% diameter (D10) is 25 μm; and the 90% diameter (D90) is 121 μm.
  All of the polymer particle diameters were measured using an SALD-2000J from Shimadzu Corporation using silicone oil as the medium.

(3) Rapid-Hardening Cement
  (i) product name: Super Jet Cement (abbreviation: SJC)
    Calcium silicate content of 47 mass %, setting time (initial) of 30 minutes, Blaine specific surface area of 4,700 cm²/g, manufacturer: Taiheiyo Cement Corporation. Contains 14 mass % anhydrous gypsum.
  (ii) Water-stop cement
    product name: Lion Shisui 105, manufacturer: Sumitomo Osaka Cement Co., Ltd.

(4) High Early Strength Portland Cement
  Calcium silicate content of 75 mass %, setting time (initial) of 30 minutes, Blaine specific surface area of 4,000 cm²/g, manufacturer: Taiheiyo Cement Corporation.

(5) Gypsum
  Natural anhydrous gypsum, product of Thailand, Blaine specific surface area of 7,200 cm²/g.

(6) Water
  product name: Binder Solution for ProJet 660 Pro, 3 mass % aqueous glycerol solution, manufacturer: 3D Systems Corporation.

2. Production of Hydraulic Compositions and Samples

Hydraulic compositions were prepared by mixing the aforementioned sand, calcium aluminates, rapid-hardening cement, cement, gypsum, and polyvinyl alcohol in accordance with the blends given in Tables 1 to 3.

Then, using these hydraulic compositions and a binder jetting-type powder lamination molding device (product name: ProJet 660 Pro, 3D Systems Corporation), molded articles having a height of 10 mm, width of 16 mm, and length of 80 mm for the cross-sectional dimensions were fabricated by binder jetting using conditions of 20° C. and a 60, relative humidity. These molded articles were subjected to atmospheric curing, for three hours or 24 hours, under conditions of 40° C. and 30% relative humidity to produce the samples. Using the hydraulic compositions of Examples 1 to 32, casting molds were fabricated proceeding in the same manner under conditions of 20° C. and a 60% relative humidity, and the casting molds were then subjected to atmospheric curing for 24 hours under conditions of 40° C. and 30% relative humidity.

In molded article fabrication using this device, the setting value for the amount of water on this device was adjusted for the shell and core as shown in Tables 1 to 3, and the water was sprayed from the nozzle onto the shell and core of the powder mixture to solidify the hydraulic composition.

TABLE 1

| | Blends (mass parts) | | | | | | Sand/binder ratio | PVA/inorganic binder ratio | PVA/(inorganic binder + sand) ratio | Setting value for amount of water | | Water/binder ratio |
|---|---|---|---|---|---|---|---|---|---|---|---|---|
| | Calcium aluminates | SJC | EP | SB1 | SB2 | PVA | | | | Shell % | Core % | |
| Ex. 1 | CA1 | 90 | 10 | 250 | 250 | 0 | 11.0 | 4.5 | 0.11 | 0.018 | 32 | 45 | 0.22 |
| Ex. 2 | | 90 | 10 | 250 | 250 | 0 | 11.0 | 4.5 | 0.11 | 0.018 | 65 | 90 | 0.47 |
| Ex. 3 | | 90 | 10 | 250 | 250 | 0 | 11.0 | 4.5 | 0.11 | 0.018 | 200 | 200 | 1.38 |
| Ex. 4 | CA2 | 90 | 10 | 300 | 300 | 0 | 14.0 | 5.3 | 0.14 | 0.020 | 65 | 90 | 0.53 |
| Ex. 5 | | 90 | 10 | 500 | 500 | 0 | 22.0 | 8.2 | 0.22 | 0.020 | 35 | 45 | 0.37 |
| Ex. 6 | | 90 | 10 | 500 | 500 | 0 | 11.0 | 9.0 | 0.11 | 0.010 | 65 | 90 | 0.84 |
| Ex. 7 | | 90 | 10 | 500 | 500 | 0 | 22.0 | 8.2 | 0.22 | 0.020 | 65 | 90 | 0.78 |
| Ex. 8 | | 90 | 10 | 500 | 500 | 0 | 22.0 | 8.2 | 0.22 | 0.020 | 98 | 135 | 1.22 |
| Ex. 9 | | 90 | 10 | 500 | 500 | 0 | 22.0 | 8.2 | 0.22 | 0.020 | 135 | 135 | 1.56 |
| Ex. 10 | | 70 | 30 | 500 | 500 | 0 | 22.0 | 8.2 | 0.22 | 0.020 | 65 | 90 | 0.78 |
| Ex. 11 | | 100 | 0 | 500 | 0 | 500 | 22.0 | 8.2 | 0.22 | 0.020 | 65 | 90 | 0.78 |
| Ex. 12 | | 100 | 0 | 300 | 0 | 700 | 22.0 | 8.2 | 0.22 | 0.020 | 65 | 90 | 0.78 |
| Ex. 13 | | 100 | 0 | 0 | 0 | 1000 | 22.0 | 8.2 | 0.22 | 0.020 | 65 | 90 | 0.79 |
| Ex. 14 | | 90 | 10 | 500 | 500 | 0 | 22.0 | 8.2 | 0.22 | 0.020 | 32 | 45 | 0.37 |
| Ex. 15 | | 90 | 10 | 500 | 500 | 0 | 33.0 | 7.5 | 0.33 | 0.030 | 65 | 90 | 0.73 |
| Ex. 16 | | 90 | 10 | 700 | 700 | 0 | 30.0 | 10.8 | 0.30 | 0.020 | 32 | 45 | 0.47 |
| Ex. 17 | | 90 | 10 | 1000 | 500 | 0 | 32.0 | 11.4 | 0.32 | 0.020 | 65 | 90 | 1.04 |
| Comp. Ex. 1 | CA1 | 90 | 10 | 75 | 75 | 0 | 4.5 | 1.4 | 0.05 | 0.018 | — | — | — |
| Comp. Ex. 2 | CA2 | 90 | 10 | 500 | 500 | 0 | 5.5 | 9.5 | 0.06 | 0.005 | 65 | 90 | 0.87 |
| Comp. Ex. 3 | | 90 | 10 | 500 | 500 | 0 | 44.0 | 6.9 | 0.44 | 0.040 | 65 | 90 | 0.69 |
| Comp. Ex. 4 | | 90 | 10 | 0 | 2000 | 0 | 22.0 | 16.4 | 0.22 | 0.010 | 33 | 45 | 0.74 |

Note.
The abbreviations used for the blends are defined in paragraph [0022].
Note.
Binder = inorganic binder + polyvinyl alcohol.
Note.
The "setting value for amount of water" is the value set using the mechanism for setting the amount of water that is provided in the binder jetting-type powder lamination molding device (product name: ProJet 660 Pro).

TABLE 2

| | Blend (mass parts) | | | | | | | | Sand/binder ratio | PVA/inorganic binder ratio | PVA/(inorganic binder + sand) ratio | Setting value for amount of water | | Water/binder ratio |
|---|---|---|---|---|---|---|---|---|---|---|---|---|---|---|
| | Calcium aluminates | | cement * gypsum | | EP | SB1 | SB2 | PVA | | | | Shell % | Core % | |
| Ex. 18 | AC | 90 | SJC | 10 | 250 | 250 | 0 | 11 | 4.5 | 0.11 | 0.018 | 65 | 90 | 0.47 |
| Ex. 19 | | 90 | | 10 | 500 | 500 | 0 | 22 | 8.2 | 0.22 | 0.020 | 65 | 90 | 0.78 |
| Ex. 20 | CA2 | 90 | high early strength cement | 10 | 500 | 500 | 0 | 22 | 8.2 | 0.22 | 0.020 | 65 | 90 | 0.78 |
| Ex. 21 | | 90 | water-stop cement | 10 | 500 | 500 | 0 | 22 | 8.2 | 0.22 | 0.020 | 65 | 90 | 0.78 |
| Ex. 22 | | 90 | gypsum | 10 | 500 | 500 | 0 | 22 | 8.2 | 0.22 | 0.020 | 65 | 90 | 0.78 |

Note.
The abbreviations used, for the blends are defined in paragraph [0022].
Note.
Binder = inorganic binder + polyvinyl alcohol.
Note.
The "setting value for amount of water" is the value set using the mechanism for setting the amount of water that is provided in the binder jetting-type powder lamination molding device (product name: ProJet 660 Pro).

TABLE 3

| | | Blend (mass parts) | | | | | | | | Sand/binder ratio | PVA/inorganic binder ratio | PVA/(inorganic binder + sand) ratio | Setting value for amount of water | | Water/binder ratio |
|---|---|---|---|---|---|---|---|---|---|---|---|---|---|---|---|
| | calcium aluminates | EP | SB1 | ZS | ZF | Z | AF | MU | FVA | | | | shell % | core % | |
| Ex. 23 | CA3 | 50 | 100 | 100 | 0 | 0 | 50 | 0 | 0 | 6 | 4.5 | 0.12 | 0.02 | 88 | 122 | 0.59 |
| Ex. 24 | | 30 | 100 | 100 | 0 | 0 | 0 | 70 | 0 | 6 | 7.5 | 0.20 | 0.02 | 88 | 122 | 1.01 |
| Ex. 25 | | 30 | 0 | 0 | 200 | 0 | 70 | 0 | 0 | 6 | 7.5 | 0.20 | 0.02 | 88 | 122 | 0.68 |
| Ex. 26 | | 30 | 100 | 100 | 0 | 0 | 0 | 0 | 70 | 6 | 7.5 | 0.20 | 0.02 | 88 | 122 | 0.98 |
| Ex. 27 | | 30 | 100 | 100 | 0 | 0 | 0 | 0 | 70 | 6 | 7.5 | 0.20 | 0.02 | 65 | 90 | 0.73 |
| Ex. 28 | | 30 | 100 | 100 | 0 | 0 | 70 | 0 | 0 | 6 | 7.5 | 0.20 | 0.02 | 88 | 122 | 0.90 |
| Ex. 29 | | 30 | 100 | 100 | 0 | 0 | 70 | 0 | 0 | 6 | 7.5 | 0.20 | 0.02 | 65 | 90 | 0.67 |
| Ex. 30 | | 50 | 200 | 200 | 0 | 0 | 0 | 50 | 0 | 10 | 7.5 | 0.20 | 0.02 | 88 | 122 | 0.99 |
| Ex. 31 | | 50 | 300 | 300 | 0 | 0 | 0 | 50 | 0 | 14 | 10.2 | 0.28 | 0.02 | 88 | 122 | 1.30 |
| Ex. 32 | | 50 | 300 | 300 | 0 | 50 | 0 | 0 | 0 | 14 | 10.2 | 0.28 | 0.02 | 388 | 122 | 1.26 |

Note.
The abbreviations used for the blends are defined in paragraph [0022].
Note.
Binder = inorganic binder + polyvinyl alcohol.
Note.
The "setting value for amount of water" is the value set using the mechanism for setting the amount of water that is provided in the binder jetting-type powder lamination molding device (product name: ProJet 660 Pro).

3. Measurement of the Sample Flexural Strength, Sample Dimensions, Workability, and Heat Resistance The flexural strength of the samples was then measured by subjecting the samples to a three-point bending test using a flexural strength tester (model: MODEL-2257, Aikoh Engineering Co., Ltd.).

For the heat resistance, the sample was mounted on an alumina plate and was then heated for one hour at 1500° C., and the presence/absence of melt bonding of the sample to the alumina plate was observed.

These results are given in Tables 4 to 6.

TABLE 4

| | Flexural strength (N/mm²) | | | Dimensional difference (%) from design value | | | | Powder leakage from the device | Spreading/leveling |
|---|---|---|---|---|---|---|---|---|---|
| | Material age | | Increase ratio | Material age = 3 hr | | Material age = 24 hr | | | |
| | 3 hr | 24 hr | | width | height | width | height | | |
| Ex. 1 | 0.73 | 1.02 | 1.40 | −1 | 2 | −1 | 1 | + | + |
| Ex. 2 | 2.12 | 2.55 | 1.20 | 1 | 1 | 1 | 2 | + | + |
| Ex. 3 | 2.05 | 3.20 | 1.56 | 2 | 7 | 1 | 7 | + | + |
| Ex. 4 | 2.02 | 2.34 | 1.16 | 2 | 3 | 1 | 2 | + | + |
| Ex. 5 | 0.94 | 1.21 | 1.29 | −1 | −1 | −1 | 0 | + | + |
| Ex. 6 | 1.70 | 2.01 | 1.18 | 0 | 2 | 0 | 1 | + | + |
| Ex. 7 | 1.58 | 2.00 | 1.27 | 0 | 2 | 1 | 2 | + | + |
| Ex. 8 | 1.99 | 2.83 | 1.42 | 2 | 3 | 1 | 3 | + | + |
| Ex. 9 | 2.22 | 3.45 | 1.55 | 1 | 7 | 0 | 7 | + | + |
| Ex. 10 | 1.55 | 1.91 | 1.23 | 0 | −1 | 1 | 0 | + | + |
| Ex. 11 | 2.85 | 3.58 | 1.26 | −1 | 4 | 0 | 5 | + | + |
| Ex. 12 | 3.24 | 4.35 | 1.34 | −1 | 4 | −1 | 4 | + | + |
| Ex. 13 | 3.13 | 3.67 | 1.17 | −1 | 5 | 0 | 5 | + | + |
| Ex. 14 | 1.27 | 1.50 | 1.18 | −1 | 4 | 0 | 5 | + | + |
| Ex. 15 | 2.95 | 3.69 | 1.25 | 0 | 3 | 0 | 3 | + | + |
| Ex. 16 | 0.98 | 1.33 | 1.36 | 0 | −5 | −1 | −5 | + | + |
| Ex. 17 | 2.39 | 2.91 | 1.22 | −1 | 3 | −1 | 4 | + | + |
| Comp. Ex. 1 | — | — | — | — | — | — | — | + | x |
| Comp. Ex. 2 | 1.22 | 1.45 | 1.19 | 4 | 7 | 2 | 6 | + | + |
| Comp. Ex. 3 | 3.07 | 3.93 | 1.28 | −4 | 7 | −4 | 8 | + | + |
| Comp. Ex. 4 | 0.64 | 0.87 | 1.36 | −2 | 2 | 0 | 2 | x | Δ |

Note.
The increase ratio = the following ratio: flexural strength at a material age of 24 hours/flexural strength at a material age of three hours
Note.
The "powder leakage from the device" in the table is as follows: + = no powder leakage, x = powder leakage occurs.
Note.
The "spreading/leveling" in the table is as follows: + = spreading/leveling is excellent; + = spreading/leveling is poor; x = spreading/leveling is very poor.

TABLE 5

| | Flexural strength (N/mm²) | | | Dimensional difference (%) from design value | | | | Powder leakage from the device | Spreading/ leveling |
|---|---|---|---|---|---|---|---|---|---|
| | Material age | | Increase | Material age = 3 hr | | Material age = 24 hr | | | |
| | 3 hr | 24 hr | ratio | width | height | width | height | | |
| Ex. 18 | 1.32 | 1.30 | 0.98 | 0 | 1 | 1 | 2 | + | + |
| Ex. 19 | 0.86 | 2.17 | 2.52 | −1 | −2 | 1 | −2 | + | + |
| Ex. 20 | 1.60 | 2.17 | 1.36 | −1 | 2 | 0 | 2 | + | + |
| Ex. 21 | 1.68 | 2.09 | 1.24 | 0 | 1 | −1 | 2 | + | + |
| Ex. 22 | 1.45 | 1.98 | 1.37 | −1 | 2 | 0 | 1 | + | + |

Note.
The increase ratio = the following ratio: flexural strength at a material age of 24 hours/flexural strength at a material age of three hours
Note.
The "powder leakage from the device" in the table is as follows: + = no powder leakage, x = powder leakage occurs.
Note.
The "spreading/leveling" in the table is as follows: + = spreading/leveling is excellent; Δ = spreading/leveling is poor; x = spreading/leveling is very poor.

TABLE 6

| | Flexural strength (N/mm²) | | | Dimensional difference (%) from design value | | | | Powder leakage from the device | Spreading/ leveling | Heat resistance Presence/ absence of melt bonding | Shrinkage (%) |
|---|---|---|---|---|---|---|---|---|---|---|---|
| | Material age | | Increase | Material age = 3 hr | | Material age = 24 hr | | | | | |
| | 3 hr | 24 hr | ratio | width | height | width | height | | | | |
| Ex. 23 | 1.1 | 3.6 | 3.3 | −1 | 0 | −1 | 0 | + | + | present | — |
| Ex. 24 | 1.2 | 3.9 | 3.3 | −1 | −1 | −2 | −1 | + | + | absent | 86 |
| Ex. 25 | 1.3 | 4.2 | 3.2 | 1 | 0 | 0 | 0 | + | + | absent | 93 |
| Ex. 26 | 1.5 | 5.5 | 3.7 | 1 | 1 | 0 | 1 | + | + | absent | 86 |
| Ex. 27 | 1.1 | 2.1 | 1.9 | 0 | 0 | −1 | 0 | + | + | absent | 86 |
| Ex. 28 | 1.4 | 5.7 | 4.1 | −1 | 1 | −1 | 0 | + | + | absent | 88 |
| Ex. 29 | 1.2 | 2.9 | 2.4 | 1 | 1 | −1 | 1 | + | + | absent | 88 |
| Ex. 30 | 1.5 | 6.0 | 4.0 | 1 | 1 | 0 | 1 | + | + | absent | 92 |
| Ex. 31 | 1.2 | 3.7 | 3.1 | 0 | 1 | 0 | 2 | + | + | absent | 95 |
| Ex. 32 | 1.6 | 5.7 | 3.6 | 1 | 1 | 0 | 2 | + | + | absent | 95 |

Note.
The increase ratio = the following ratio: flexural strength at a material age of 24 hours/flexural strength at a material age of three hours
Note.
The "powder leakage from the device" in the table is as follows: + = no powder leakage, x = powder leakage occurs.
Note.
The "spreading/leveling" in the table is as follows: + = spreading/leveling is excellent; Δ = spreading/leveling is poor; x = spreading/leveling is very poor.
Note.
The "presence/absence of melt bonding" in the "heat resistance" in the table refers to the presence/absence of melt bonding between the hydraulic composition and the alumina plate.

4. Test Results (1) Flexural Strength, Dimensional Stability, and Workability

As shown for Examples 1 to 32 in Tables 4 to 6, hydraulic compositions for additive manufacturing devices that satisfied conditions (1) and (2), and samples thereof, had a high flexural strength of at least 0.7 N/mm² at a material age of three hours and had a high flexural strength of at least 1 N/mm² at a material age of 24 hours, did not exhibit powder leakage, and had an excellent spreading and leveling.

On the other hand, as shown for Comparative Examples 1 to 4 in Table 3, samples prepared using a hydraulic composition for additive manufacturing devices that did not satisfy (1) or (2) presented, for example, had the following problems: low flexural strength, low dimensional stability at both a material age of three hours and a material age of 24 hours, powder leakage from the powder supply tank outside of the spreading and leveling sequence due to the high flowability of the hydraulic composition, and/or undulation of the spread/leveled surface.

Among these examples, the flexural strength tends to decline when the water/binder material ratio is low. In addition, the dimensional accuracy tends to be poor, notwithstanding a high flexural strength, when the water/binder material ratio is large. In addition, among the calcium aluminates, the use of amorphous calcium aluminate is shown to provide an earlier strength development than the alumina cement.

(2) Heat Resistance

As shown in Table 6, in Examples 24 to 32, where the sand/binder material ratio is at least 7, melt bonding to the alumina plate does not occur, even after heating at 1500° C., and the heat resistance is excellent.

In addition, among the artificial sands used, a high heat resistance was exhibited for the cured articles from hydraulic compositions that used an alumina-type fine powder or a fine powder for which zirconium silicate was the main component.

5. Preparation of Casting Molds

Castings were produced by introducing casting steel into the casting molds fabricated using the hydraulic compositions according to Examples 1 to 32: in all of the examples, casts having a smooth surface could be produced.

The invention claimed is:

1. A hydraulic composition for an additive manufacturing device, the hydraulic composition comprising at least sand, an inorganic binder, and polyvinyl alcohol, wherein the hydraulic composition for an additive manufacturing device satisfies conditions (1) and (2) below:
   (1) a mass ratio of the sand/(inorganic binder+polyvinyl alcohol) is 4 to 12; and
   (2) a mass ratio of the polyvinyl alcohol/inorganic binder is 0.1 to 0.4; and
   wherein the inorganic binder contains amorphous calcium aluminates alone or contains at least 50 mass % and less than 100 mass % of the amorphous calcium aluminates for 100 mass % of a total of the amorphous calcium aluminates and a rapid-hardening cement.

2. The hydraulic composition for an additive manufacturing device according to claim 1, which additionally satisfies condition (3) below:
   (3) a mass ratio of water to the (inorganic binder+polyvinyl alcohol) is 0.30 to 1.30.

3. A method for producing a casting mold using the hydraulic composition for an additive manufacturing device according to claim 1, comprising:
   mixing the at least sand, inorganic binder, and polyvinyl alcohol and preparing the hydraulic composition, and
   spreading the prepared hydraulic composition within the additive manufacturing device and forming the casting mold.

* * * * *